United States Patent
Pyrhönen et al.

(10) Patent No.: US 9,712,011 B2
(45) Date of Patent: Jul. 18, 2017

(54) ELECTRIC MACHINE WITH MODULAR STATOR COILS AND COOLING TUBES

(75) Inventors: Juha Pyrhönen, Lappeenranta (FI); Janne Nerg, Lappeenranta (FI); Hanne Jussila, Lappeenranta (FI); Yulia Alexandrova, Lappeenranta (FI); Maria Polikarpova, Lappeenranta (FI); Robert Scott Semken, Lappeenranta (FI); Pekka Röyttä, Lappeenranta (FI)

(73) Assignee: LAPPEENRANNAN TEKNILLINEN YLIOPISTO, Lappeenranta (FI)

( * ) Notice: Subject to any disclaimer, the term of this patent is extended or adjusted under 35 U.S.C. 154(b) by 861 days.

(21) Appl. No.: 13/880,185

(22) PCT Filed: Oct. 17, 2011

(86) PCT No.: PCT/FI2011/050904
§ 371 (c)(1),
(2), (4) Date: Jul. 15, 2013

(87) PCT Pub. No.: WO2012/052618
PCT Pub. Date: Apr. 26, 2012

(65) Prior Publication Data
US 2013/0285487 A1 Oct. 31, 2013

(30) Foreign Application Priority Data
Oct. 18, 2010 (FI) .................... 20106075

(51) Int. Cl.
*H02K 3/24* (2006.01)
*H02K 15/06* (2006.01)
(Continued)

(52) U.S. Cl.
CPC ............... *H02K 3/24* (2013.01); *H02K 3/18* (2013.01); *H02K 3/22* (2013.01); *H02K 15/065* (2013.01);
(Continued)

(58) Field of Classification Search
CPC .......... H02K 3/24; H02K 3/22; H02K 15/065; H02K 3/18; H02K 15/066; H02K 15/0414;
(Continued)

(56) References Cited

U.S. PATENT DOCUMENTS 1,448,700 A * 3/1923 Seidner .................. H02K 3/22
310/54
2,390,130 A * 12/1945 Sigmund et al. ............ 310/54
(Continued)

FOREIGN PATENT DOCUMENTS

| | | |
|---|---|---|
| CA | 1147006 | 5/1983 |
| DE | 2717058 | 10/1978 |

(Continued)

OTHER PUBLICATIONS

Finnish Search Report, dated Feb. 19, 2015, in corresponding Finnish Patent Application No. 20145920.
(Continued)

*Primary Examiner* — Naishadh Desai
(74) *Attorney, Agent, or Firm* — Young & Thompson (57) ABSTRACT

A stator of an electrical machine includes a stator core having a plurality of stator teeth and stator slots, and a stator winding having a plurality of stator coils. The width of each stator coil is one stator slot pitch, and the stator teeth are shaped to allow each stator coil to be installed by pushing the stator coil to surround one of the stator teeth. The stator coils include tubular cooling channels for conducting cooling liquid in the stator slots.

13 Claims, 9 Drawing Sheets

(51) Int. Cl.
*H02K 3/22* (2006.01)
*H02K 3/18* (2006.01)
*H02K 15/04* (2006.01)

(52) U.S. Cl.
CPC ....... *H02K 15/0414* (2013.01); *H02K 15/066* (2013.01); *H02K 2213/03* (2013.01); *H02K 2213/12* (2013.01); *Y02E 10/725* (2013.01)

(58) Field of Classification Search
CPC ........... H02K 2213/12; H02K 2213/03; H02K 2201/15; H20K 1/148
USPC .................................. 310/214, 215, 52–64
See application file for complete search history.

(56) References Cited

U.S. PATENT DOCUMENTS

| | | | | |
|---|---|---|---|---|
| 2,898,484 | A * | 8/1959 | Krastchew | 310/52 |
| 2,903,609 | A * | 9/1959 | Waddington | 310/64 |
| 2,965,775 | A * | 12/1960 | Archer | 310/64 |
| 3,249,775 | A * | 5/1966 | Baylac | 310/54 |
| 3,261,995 | A * | 7/1966 | Kohn | 310/64 |
| 3,287,580 | A * | 11/1966 | Broniewski et al. | 310/58 |
| 3,634,705 | A * | 1/1972 | Fidei | H02K 3/22 310/57 |
| 4,152,610 | A * | 5/1979 | Wallenstein | 310/59 |
| 4,229,671 | A | 10/1980 | Lesokhin et al. | |
| 4,427,907 | A | 1/1984 | Flick et al. | |
| 4,701,648 | A * | 10/1987 | Haditsch | 310/61 |
| 5,140,204 | A * | 8/1992 | Cashmore | H02K 9/20 310/214 |
| 5,986,377 | A * | 11/1999 | Yamada et al. | 310/216.013 |
| 6,113,024 | A * | 9/2000 | Pittard | H02K 3/527 242/433 |
| 6,265,801 | B1 * | 7/2001 | Hashiba et al. | 310/214 |
| 6,313,556 | B1 * | 11/2001 | Dombrovski | H02K 3/24 29/596 |
| 8,093,769 | B2 * | 1/2012 | Sonohara | B60K 6/26 310/194 |
| 8,487,500 | B2 * | 7/2013 | Cullen | H02K 3/24 310/215 |
| 2002/0163256 | A1 * | 11/2002 | Tajima | H02K 41/0356 310/12.29 |
| 2005/0012409 | A1 * | 1/2005 | Philippart | 310/54 |
| 2006/0145548 | A1 * | 7/2006 | Wakita | H02K 3/24 310/54 |
| 2007/0090711 | A1 * | 4/2007 | Carl | H02K 1/276 310/156.48 |
| 2009/0302694 | A1 | 12/2009 | Asai | |
| 2010/0026133 | A1 | 2/2010 | Fubuki et al. | |
| 2010/0225183 | A1 | 9/2010 | Baik et al. | |
| 2010/0253176 | A1 | 10/2010 | Ovrebo et al. | |
| 2012/0161557 | A1 * | 6/2012 | Mizutani | H02K 55/04 310/64 |
| 2012/0165198 | A1 * | 6/2012 | Mizutani | H02K 3/24 505/163 |

FOREIGN PATENT DOCUMENTS

| | | | |
|---|---|---|---|
| DE | 19621058 | 11/1997 | |
| EP | 0080825 A1 | 6/1983 | |
| GB | 729231 A * | 5/1955 | H02K 3/24 |
| GB | 769762 | 3/1957 | |
| GB | 1203062 | 8/1970 | |
| GB | 1316256 | 5/1973 | |
| GB | 1456068 * | 11/1976 | H02K 3/04 |
| JP | 58-15443 | 1/1983 | |
| JP | 59117433 | 7/1984 | |
| JP | 60190134 | 9/1985 | |
| JP | 61-149942 | 9/1986 | |
| JP | 5049198 | 2/1993 | |
| JP | 2009-033898 | 2/2009 | |
| JP | 2009-33898 | 2/2009 | |
| UA | 73661 C2 | 6/2005 | |
| WO | 0113496 A1 | 2/2001 | |

OTHER PUBLICATIONS

Finnish Search Report, dated Mar. 24, 2011, from corresponding Finnish application.
Canadian Office Action, dated Jun. 11, 2015, in corresponding Canadian Application No. 2,849,231.
Finnish Search Report, dated Jul. 24, 2013; Application No. 20106075.
Partial International Search Report, dated Apr. 23, 2013; Application No. PCT/FI2011/050904.
Canadian Office Action issued in Application No. 2849231, dated Jan. 25, 2017.

\* cited by examiner

ELECTRIC MACHINE WITH MODULAR STATOR COILS AND COOLING TUBES

FIELD OF THE INVENTION

The invention relates generally to rotating electrical machines. More particularly, the invention relates to a liquid cooled stator of an electrical machine and to a liquid cooled rotating electrical machine.

BACKGROUND

Power plants comprising a direct driven generator have several advantages, such as high mechanical reliability and low mechanical losses, due to the fact that there is no gear between the generator and a prime mover, e.g. a turbine, of the power plant. In many applications, a drawback of directly driven generators is that the mechanical size of the generator and thereby its weight can be quite big because the mechanical size is determined by the required maximum torque and the cooling of the generator. In a radial flux electrical machine, the maximum torque is proportional to the product of the air-gap radius, the area of the air-gap surface, the magnetic flux density (Tesla) in the air-gap and, the linear current density (Amperes/meter) in air-gap surface. Hence, without increasing the mechanical size of the electrical machine, the maximum torque can be increased by increasing the linear current density because the magnetic flux density cannot practically be increased any more when it is above the saturation point of iron. Increasing the linear current density increases, however, the resistive losses in a winding that produces the linear current density, and therefore the cooling of the said winding has to be made more effective.

The most effective method for cooling the winding of an electrical machine is a liquid cooling in which the cooling liquid is in contact or at least in close vicinity of electrical conductors of the winding. The liquid cooling of the winding is traditionally used in conjunction with large turbo-generators in which the electrical conductors of stator coils can be hollow so as to allow the cooling liquid to flow inside the electrical conductors. For example, the publication UA73661 discloses a liquid cooled stator of an electrical machine. The stator comprises a magnetic core with hydrogen cooling and a three-phase winding having hollow bars for the cooling liquid. Hydrogen pressure in the hydrogen cooling system of the magnetic core corresponds to liquid pressure in the liquid cooling system of the winding. A general inconvenience related to liquid cooled windings is that manufacturing and assembling of a liquid cooled winding is more complex and expensive than manufacturing and assembling of an air cooled winding.

SUMMARY

In accordance with the first aspect of the invention, there is provided a new stator for an electrical machine. The stator according to the invention comprises:
- a stator core comprising a plurality of stator teeth and stator slots, and
- a stator winding comprising a plurality of stator coils, wherein:
  - width of each stator coil is one stator slot pitch,
  - the stator teeth are shaped to allow each stator coil to be installed by pushing the stator coil to surround one of the stator teeth without changing the shape of the stator coil, and
  - the stator coils comprise tubular cooling channels for conducting cooling liquid in the stator slots in the longitudinal direction of electrical conductors of the stator coils.

As the stator teeth are shaped to allow each stator coil to be installed by pushing the stator coil to surround one of the stator teeth, the liquid cooled stator coils can be assembled before installing them to the stator core. Hence, the present invention solves a technical problem which is present in prior art electrical machines equipped with a liquid cooled stator winding, namely that it is complicated to equip such a stator winding, which is typical to multiphase alternating current electrical machines, with liquid cooling. In conjunction with the present invention, the view-point has been reversed so that the stator winding is designed by taking into account the aspects related to the liquid cooling, and it has been noticed that the above-described stator structure which is advantageous for arranging the liquid cooling has also satisfactory electrical and magnetic properties when used, for example, in a low-speed wind turbine generator.

In an advantageous exemplifying embodiment of the present invention, the tubular cooling channels are formed by cooling tubes made of different material than the electrical conductors of the stator coils and attached to the electrical conductors of the stator coils. In this case, the material of the cooling tubes can be selected on the basis of aspects related to resistance against corrosive and erosive effects of the cooling liquid and the material of the electrical conductors can be selected on the basis of aspects related to electrical properties. Hence, the need for compromises in the above-mentioned aspects is reduced. The cooling tubes can be made of, for example, stainless steel and the electrical conductors can be made of, for example, copper. Furthermore, when the stator coils comprise separate cooling tubes and electrical conductors, it is more straightforward to connect the stator winding to a liquid circulation system than in a case in which there are hollow electrical conductors which constitute the tubular channels for the cooling liquid.

In accordance with the second aspect of the invention, there is provided a new electrical machine. The electrical machine according to the invention comprises a rotor and a stator, wherein the stator comprises:
- a stator core comprising a plurality of stator teeth and stator slots, and
- a stator winding comprising a plurality of stator coils, wherein:
  - width of each stator coil is one stator slot pitch,
  - the stator teeth are shaped to allow each stator coil to be installed by pushing the stator coil to surround one of the stator teeth without changing the shape of the stator coil, and
  - the stator coils comprise tubular cooling channels for conducting cooling liquid in the stator slots in the longitudinal direction of electrical conductors of the stator coils.

The electrical machine can be, for example, a directly driven wind turbine generafor and its rotor may comprise permanent magnets for producing an excitation magnetic flux.

The electrical machine can be an inner rotor radial flux machine, an outer rotor radial flux machine, or an axial flux machine.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF EXEMPLIFYING EMBODIMENTS

Figure 1:
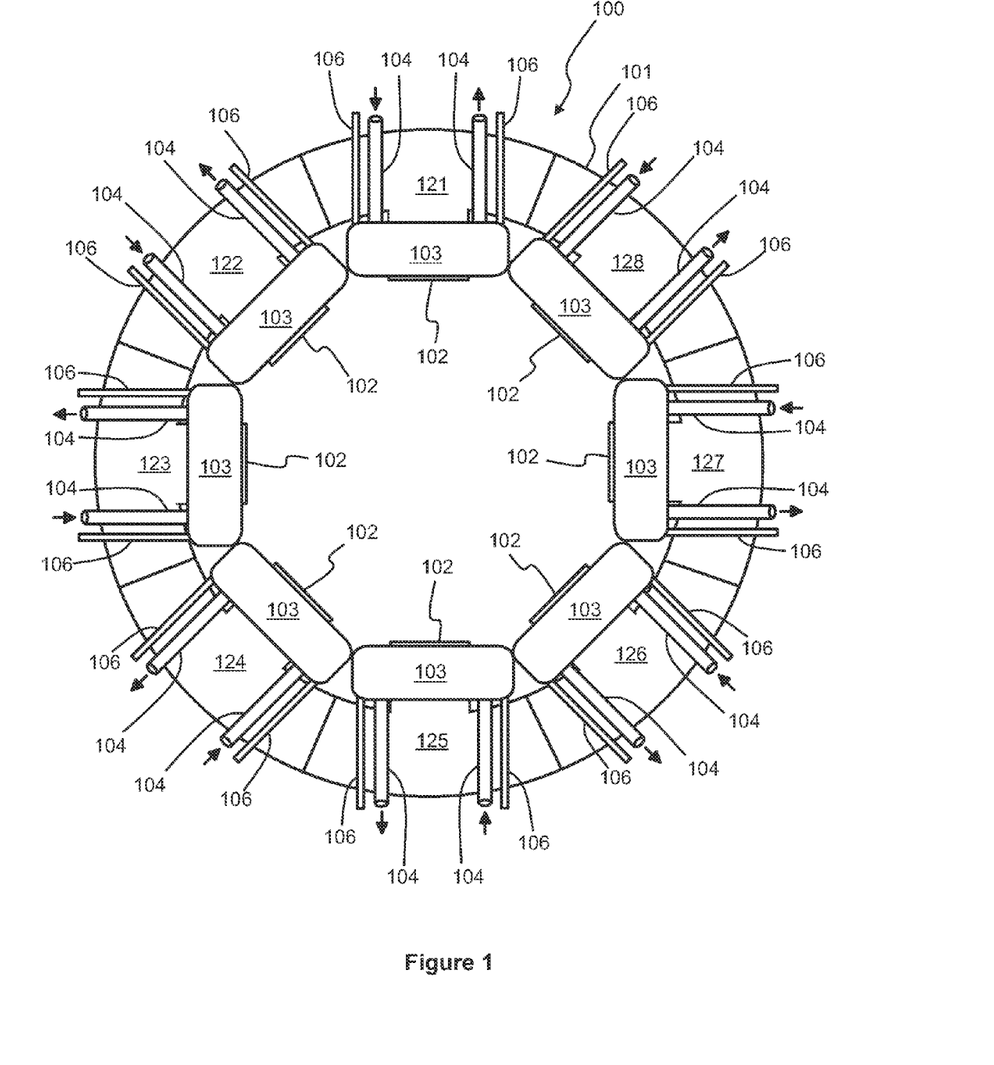
FIG. 1 shows a schematic illustration of a stator according to an embodiment of the invention.

FIG. 1 shows a schematic illustration of a stator 100 according to an embodiment of the invention. The stator comprises a stator core 101 having a plurality of stator teeth 102 and stator slots between adjacent stator teeth. The stator core is preferably made of steel sheets that are electrically insulated from each other and that are stacked in the direction perpendicular to the plane of FIG. 1. The stator comprises a stator winding having a plurality of stator coils 103. The width of each stator coil is one stator slot pitch, and the stator teeth are shaped to allow each stator coil to be installed by pushing the stator coil to surround one of the stator teeth. The electrically series connected turns of the stator coils are electrically insulated from each other, and the required strength of the insulation depends on the voltage level being used. The stator coils comprise tubular cooling channels for conducting cooling liquid in the stator slots in the longitudinal direction of electrical conductors of the stator coils. As the stator teeth are shaped to allow each stator coil to be installed by pushing the stator coil to surround one of the stator teeth and the end-windings of the stator coils do not crisscross with each other, the liquid cooled stator coils 103 can be assembled before installing them to the stator core 101.

In the exemplifying stator illustrated in FIG. 1, the tubular cooling channels are formed by cooling tubes 104 that are attached to the electrical conductors of the stator coils. FIG. 1 shows the terminals 106 of the electrical conductors of the stator coils. It is also possible that the electrical conductors of the stator coils 103 are tubular so that the electrical conductors form the tubular cooling channels. However, the structure in which the tubular cooling channels are formed by cooling tubes 104 that are attached to the electrical conductors of the stator coils has certain advantages. Firstly, the cooling tubes 104 can be made of different material than the electrical conductors of the stator coils. Therefore, the material of the cooling tubes 104 can be selected on the basis of aspects related to resistance against corrosive and erosive effects of the cooling liquid and the material of the electrical conductors can, in turn, be selected on the basis of aspects related to electrical properties. Hence, the need for compromises in the above-mentioned aspects is reduced. The cooling tubes 104 can be made of, for example, stainless steel and the electrical conductors can be made of, for example, copper. Furthermore, when the stator coils comprise separate cooling tubes and electrical conductors, it is more straightforward to connect the stator winding to a liquid circulation system than in a case in which there are hollow electrical conductors which constitute the tubular channels for the cooling liquid.

The stator illustrated in FIG. 1 has eight stator teeth and thereby eight stator slots. As evident, this number of stator teeth and slots is only an example and stators according to various embodiments of the invention may have a different number of stator teeth and slots. For example, if the stator coils are connected to constitute a symmetrical three phase system, the number of stator teeth and slots is advantageously 3×N, where N is an integer. The stator coils 103 can be connected via their terminals 105 in a desired manner in parallel and/or in series in order to achieve a desired voltage level.

In a stator according to an embodiment of the invention, the stator core 101 consists of a plurality of stator segments 121, 122, 123, 124, 125, 126, 127, and 128 that are joined to each other in the tangential direction.

In a stator according to an embodiment of the invention, the stator winding is coated with a layer of resin so as to protect the stator winding against external stresses. The resin can be, for example, epoxy resin.

Figure 2:
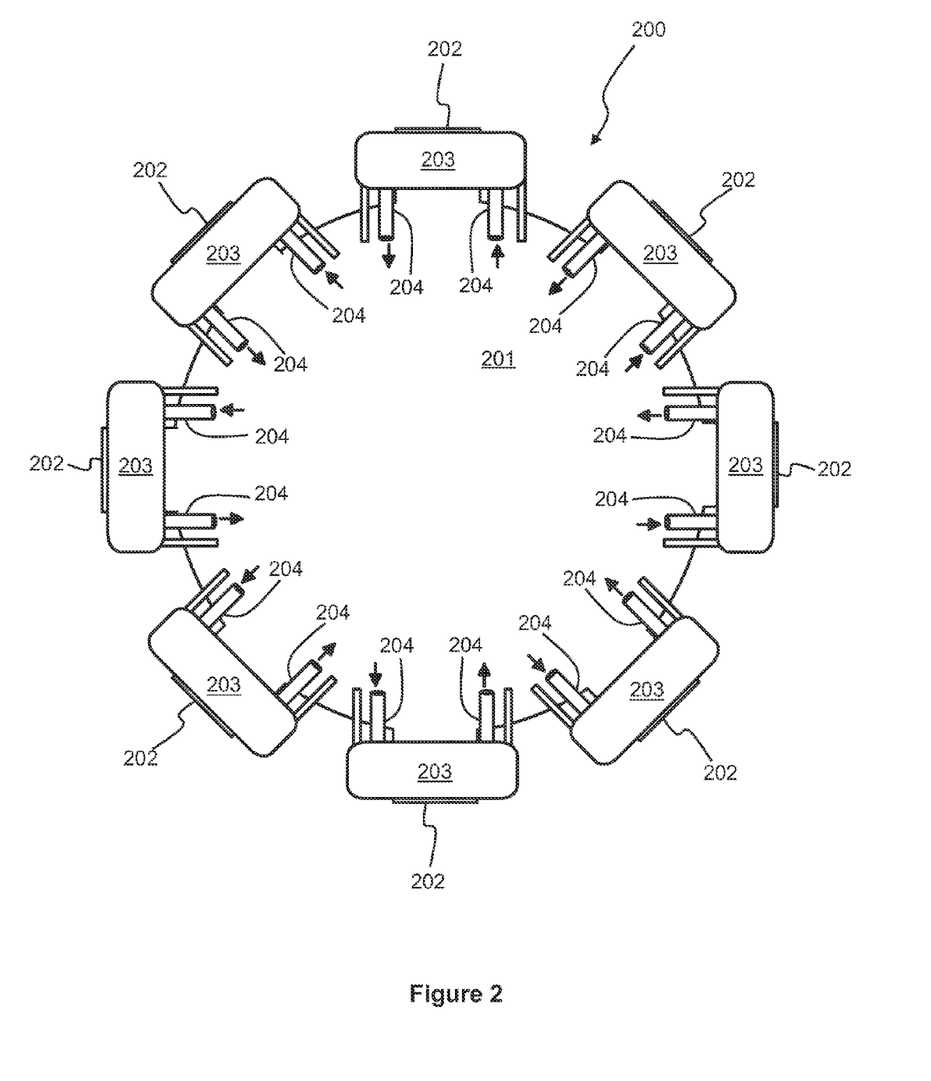
FIG. 2 shows a schematic illustration of a stator according to an embodiment of the invention.

The stator illustrated in FIG. 1 is a stator for an inner rotor radial flux electrical machine. FIG. 2 shows a schematic illustration of a stator 200 according to an embodiment of the invention for an outer rotor radial flux electrical machine. The stator 200 comprises:

a stator core 201 comprising a plurality of stator teeth 202 and stator slots, and a stator winding comprising a plurality of stator coils 203, wherein:

width of each stator coil is one stator slot pitch, the stator teeth are shaped to allow each stator coil to be installed by pushing the stator coil to surround one of the stator teeth, and the stator coils comprise tubular cooling channels 204 for conducting cooling liquid in the stator slots in the longitudinal direction of electrical conductors of the stator coils.

Figure 3:
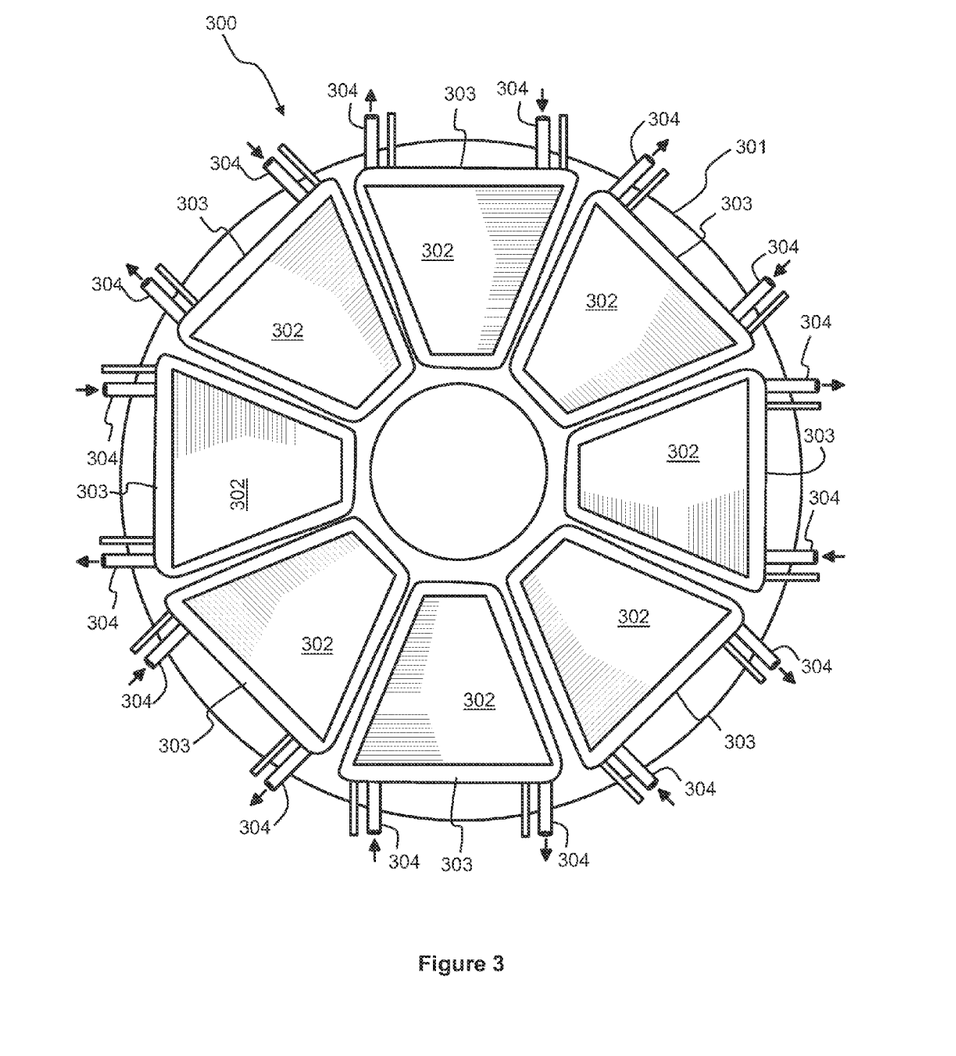
FIG. 3 shows a schematic illustration of a stator according to an embodiment of the invention.

FIG. 3 shows a schematic illustration of a stator 300 according to an embodiment of the invention for an axial flux electrical machine. The stator 300 comprises:

a stator core 301 comprising a plurality of stator teeth 302 and stator slots, and a stator winding comprising a plurality of stator coils 303, wherein:

width of each stator coil is one stator slot pitch, the stator teeth are shaped to allow each stator coil to be installed by pushing the stator coil to surround one of the stator teeth, and the stator coils comprise tubular cooling channels 304 for conducting cooling liquid in the stator slots in the longitudinal direction of electrical conductors of the stator coils.

Figure 4A:
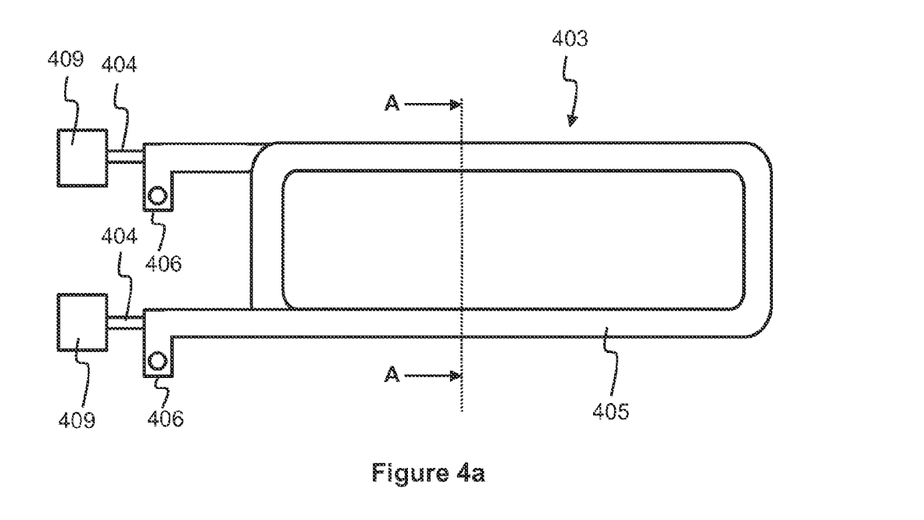
FIGS. 4a and 4b illustrate a stator coil of a stator according to an embodiment of the invention.
Figure 4B:
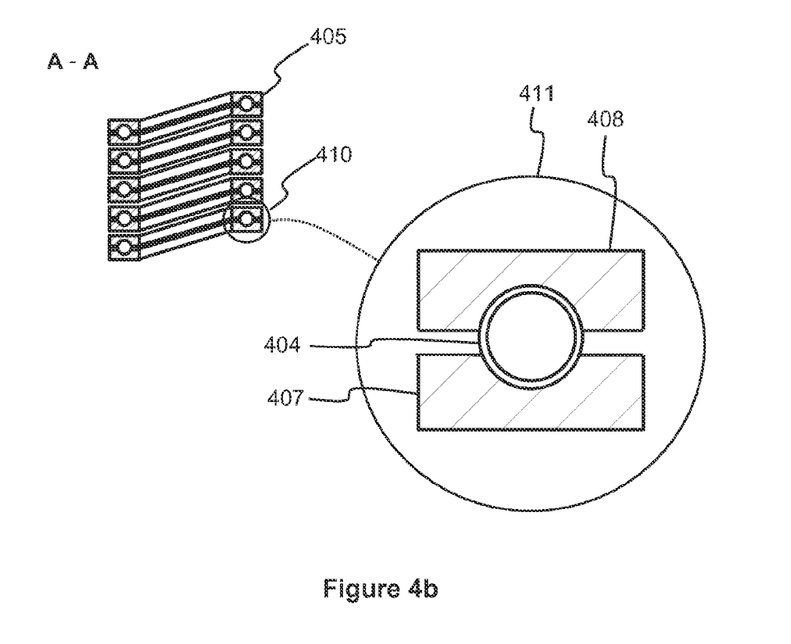

In a stator according to an embodiment of the invention, the electrical conductor of each stator coil stator coil comprises two electrically parallel connected bars of electrically conductive material and the tubular cooling channel of each stator coil is formed by a cooling tube placed between the bars. The electrically conductive material can be, for example, copper and the cooling tube can be made of, for example, stainless steel. FIGS. 4a and 4b illustrate a stator coil 403 of a stator according to the above-described embodiment of the invention. FIG. 4b shows a section taken along the line A-A of FIG. 4a. FIG. 4b contains a magnification 411 of the area 410. The stator coil 403 comprises an electrical conductor 405 that is composed of bars 407 and 408 of electrically conductive material. The bars 407 and 408 are connected to electrical terminals 406 of the stator coil. The stator coil comprises a cooling tube 404 placed between the bars 407 and 408. The stator coil 403 further comprises electrically insulating connecting elements 409 at the ends of the cooling tube 404.

Figure 5A:
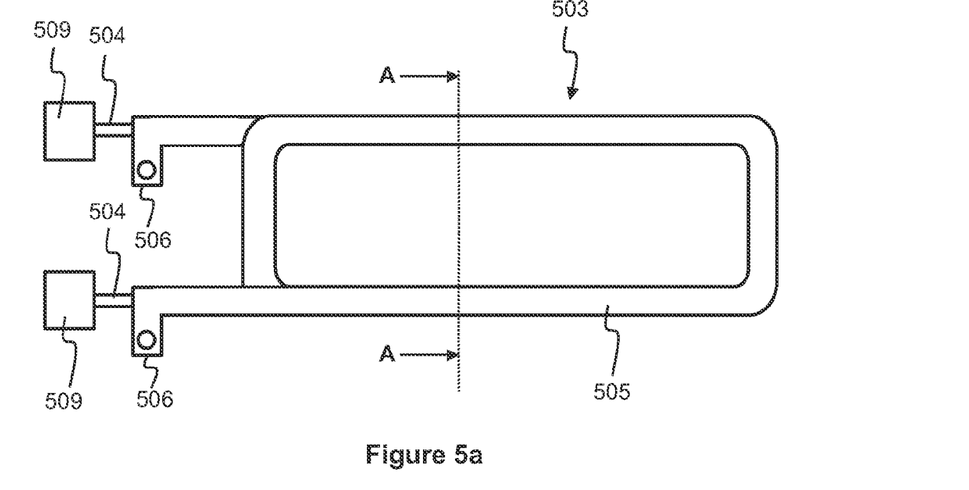
FIGS. 5a and 5b illustrate a stator coil of a stator according to an embodiment of the invention.
Figure 5B:
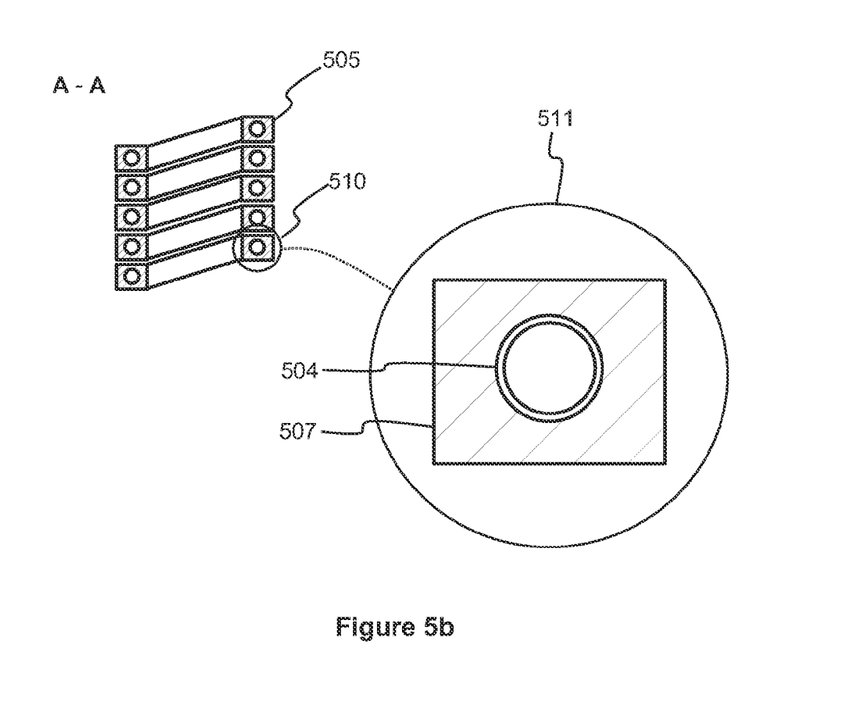

In a stator according to an embodiment of the invention, the electrical conductor of each stator coil comprises a sleeve of electrically conductive material and the tubular cooling channel of each stator coil is formed by a cooling tube placed inside the sleeve of the electrically conductive material. The electrically conductive material can be, for example, copper and the cooling tube can be made of, for example, stainless steel. FIGS. 5a and 5b illustrate a stator coil 503 of a stator according to the above-described embodiment of the invention. FIG. 5b shows a section taken along the line A-A of FIG. 5a. FIG. 5b contains a magnification 511 of the area 510. The stator coil 503 comprises an electrical conductor 505 that is a sleeve 507 of electrically conductive material. The sleeve of the electrically conductive material is connected to electrical terminals 506 of the stator coil. The stator coil comprises a cooling tube 508 surrounded by the sleeve 507. The stator coil 503 further comprises electrically insulating connecting elements 509 at the ends of the cooling tube 504.

Figure 6A:
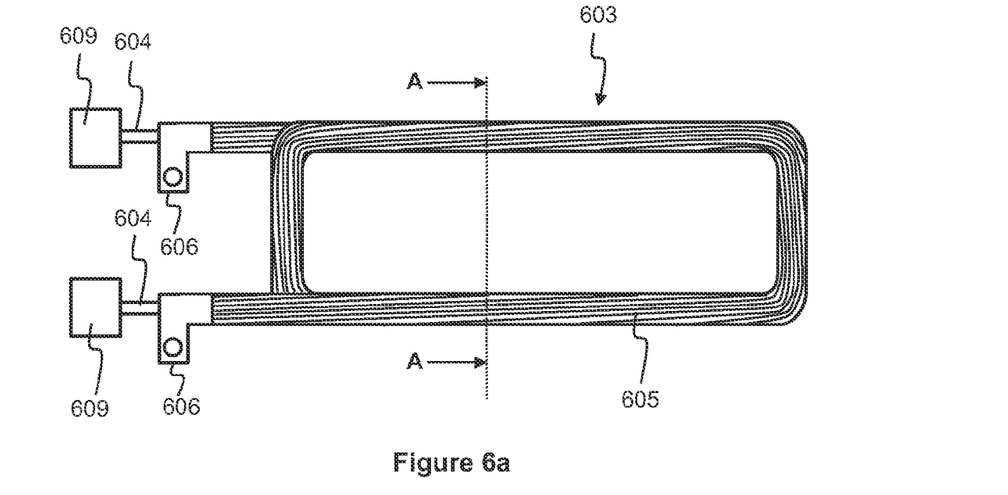
FIGS. 6a and 6b illustrate a stator coil of a stator according to an embodiment of the invention.
Figure 6B:
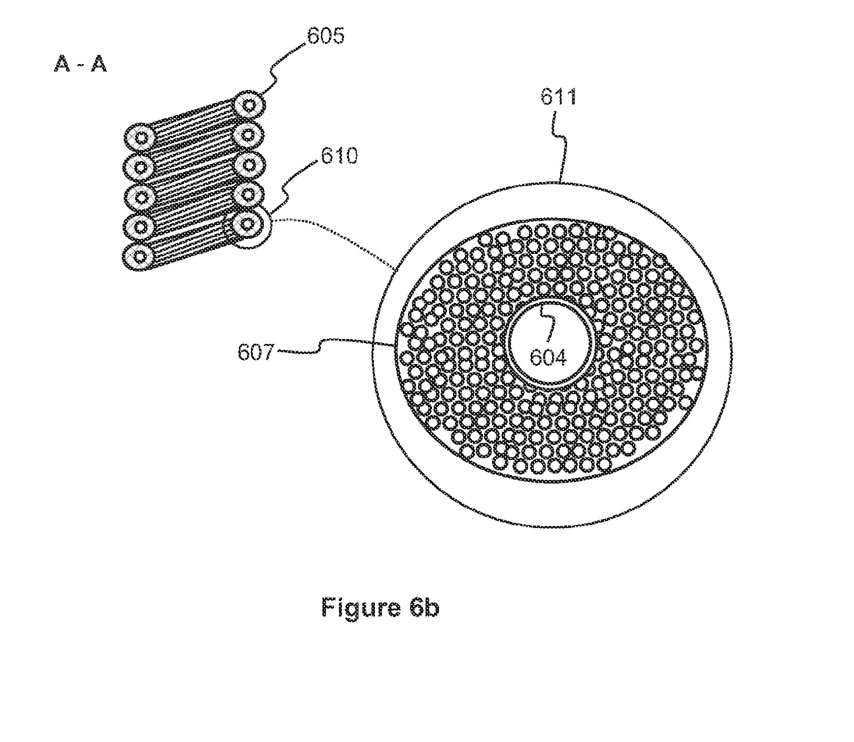

In a stator according to an embodiment of the invention, the electrical conductor of each stator coil comprises a bundle of electrically parallel connected wires of electrically conductive material, and the tubular cooling channel of each stator coil is formed by a cooling tube placed inside the bundle. The electrically conductive material can be, for example, copper and the cooling tube can be made of, for example, stainless steel. Each the stator coils further comprises electrical insulator material between adjacent wires of the electrically conductive material. The wires can be, for example, Litz wires which consist of many thin wire strands that are individually insulated and twisted or woven together. The insulation can be made using, for example, the vacuum impregnation method. A stator according to this embodiment of the invention is better suitable for high frequency currents than a stator in which electrical conductors are made of solid material. FIGS. 6a and 6b illustrate a stator coil 603 of a stator according to the above-described embodiment of the invention. FIG. 6b shows a section taken along the line A-A of FIG. 6a. FIG. 6b contains a magnification 611 of the area 610. The stator coil 603 comprises an electrical conductor 605 that is a bundle 607 of electrically parallel connected wires of electrically conductive material. The bundle 607 is connected to electrical terminals 606 of the stator coil. The stator coil comprises a cooling tube 608 surrounded by the wires of the bundle 607. The stator coil 603 further comprises electrically insulating connecting elements 609 at the ends of the cooling tube 604.

Figure 7:
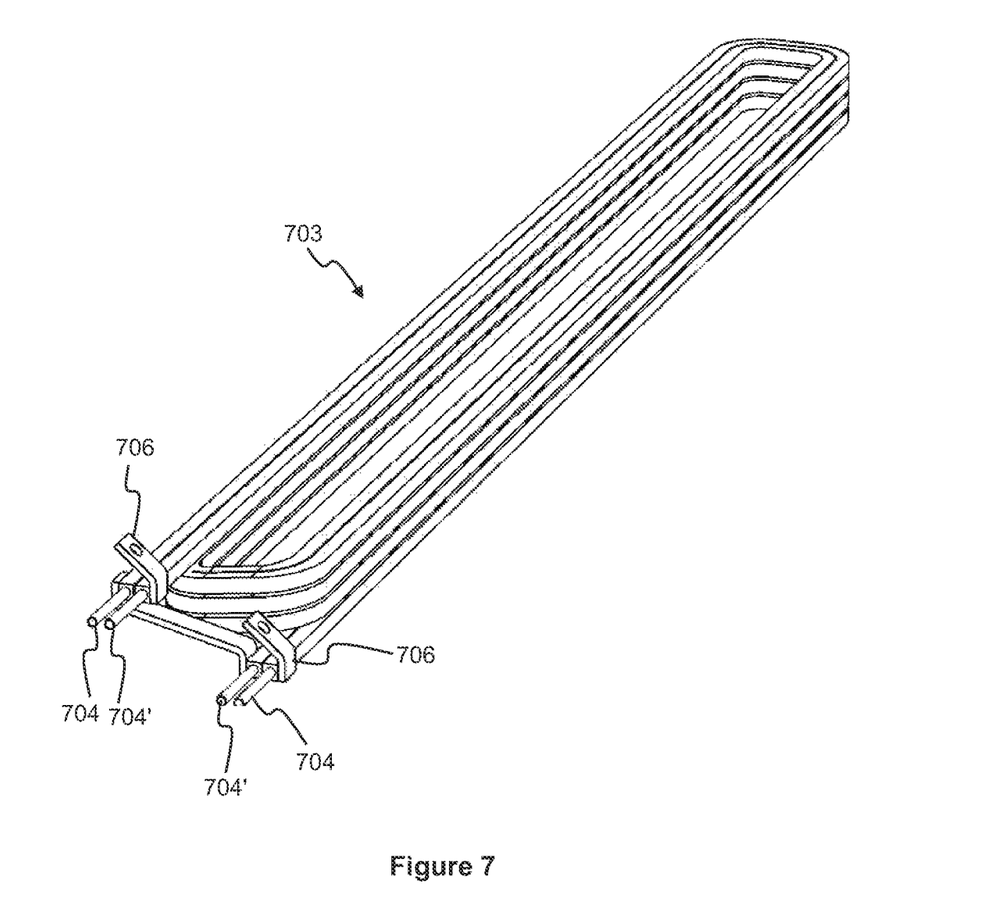
FIG. 7 illustrates a stator coil of a stator according to an embodiment of the invention.

In a stator according to an embodiment of the invention, each stator coil comprises two cooling tubes which constitute parallel paths for the cooling liquid and the electrical conductors attached to these two cooling tubes are electrically series connected. Hence, an effective cooling can be arranged in a situation in which there are several turns in series in the stator coils. FIG. 7 illustrates a stator coil 703 of a stator according to the above-described embodiment of the invention. The stator coil 703 comprises two cooling tubes 704 and 704' which constitute parallel paths for the cooling liquid and the electrical conductors attached to these two cooling tubes are electrically series connected between end terminals 706.

Figure 8:
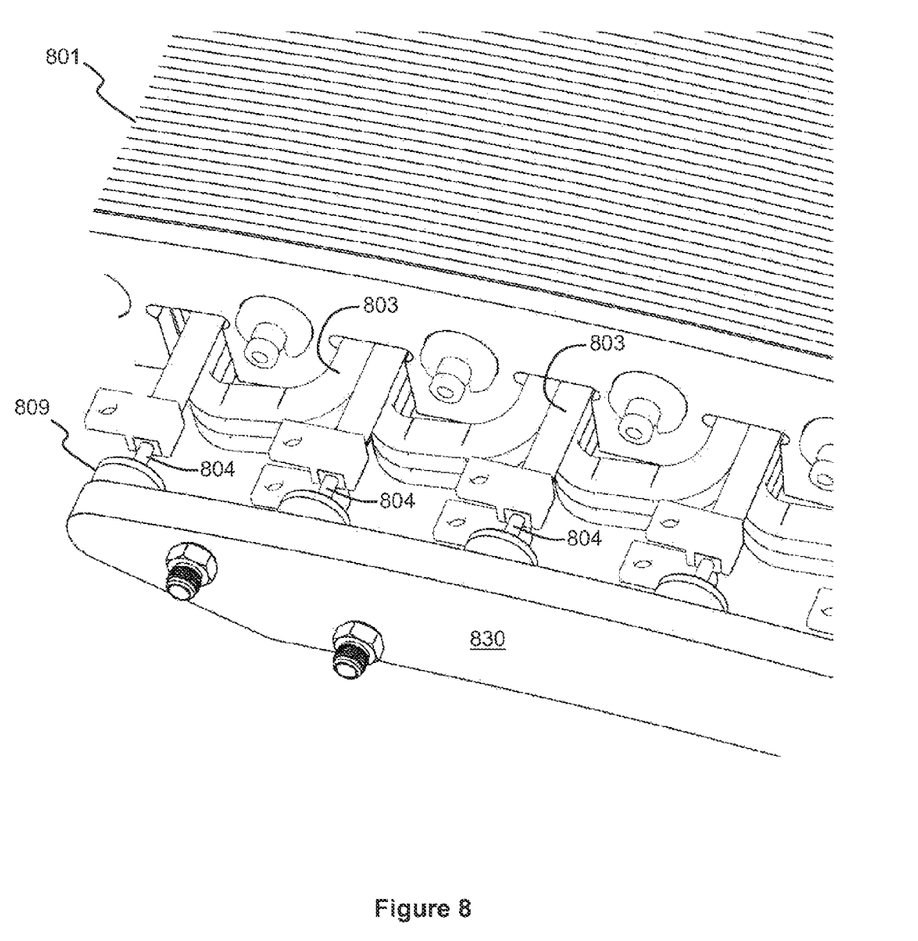
FIG. 8 shows a part of a stator according to an embodiment of the invention.
Figure 9:
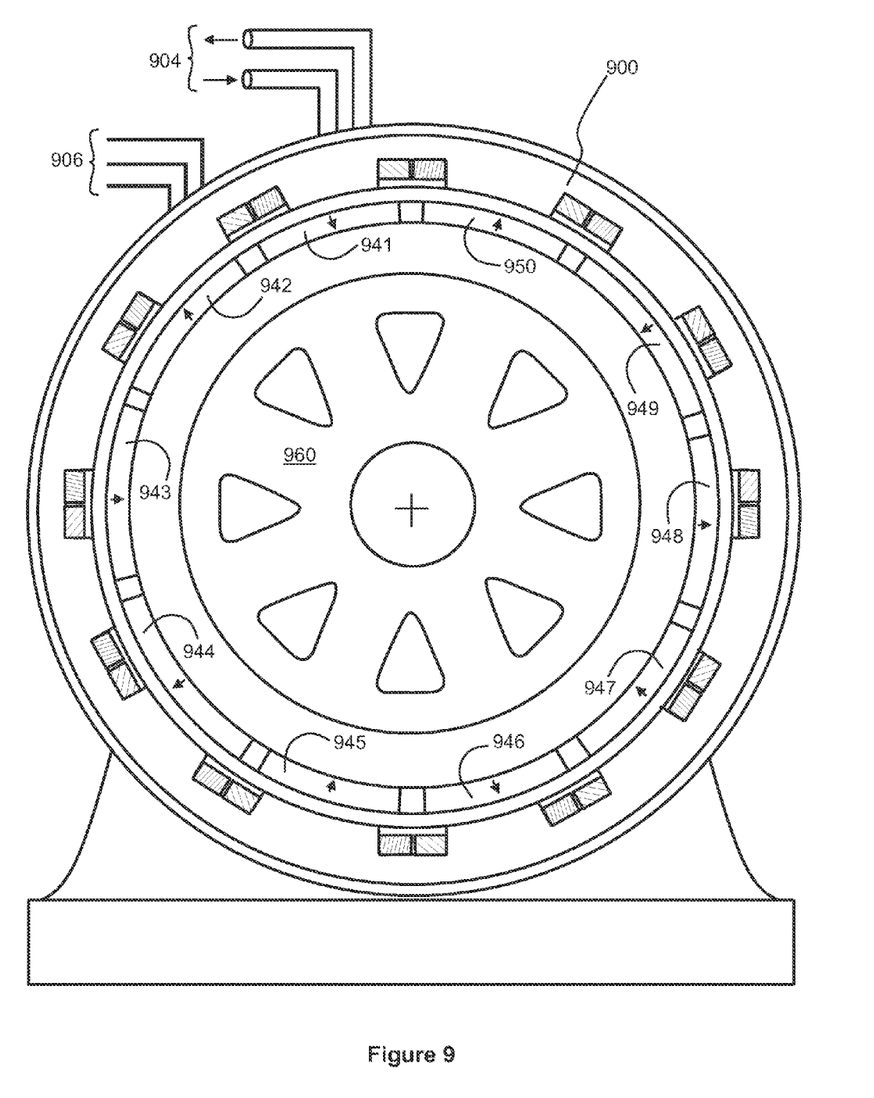
FIG. 9 shows a schematic illustration of an electrical machine according to an embodiment of the invention.

FIG. 8 shows a part of a stator according to an embodiment of the invention. The stator comprises a stator core 801 having a plurality of stator teeth and stator slots, and a stator winding having a plurality of stator coils 803. The width of each stator coil is one stator slot pitch, and the stator teeth are shaped to allow each stator coil to be installed by pushing the stator coil to surround one of the stator teeth. The stator coils comprise tubular cooling channels for conducting cooling liquid in the stator slots in the longitudinal direction of electrical conductors of the stator coils. In the case shown in FIG. 8, the stator coils comprise cooling tubes 804 that form the tubular cooling channels. The cooling tubes are connected with electrically insulating connecting elements 809 to a manifold 830 of a cooling liquid circulation system. The stator coils 803 can be locked to the stator slots for example by using slot wedges that are mounted to the openings of the stator slots FIG. 9 shows a schematic illustration of an electrical machine according to an embodiment of the invention. The electrical machine comprises a rotor 960 and stator 900. The stator comprises a stator core having a plurality of stator teeth and stator slots, and a stator winding having a plurality of stator coils, wherein:

width of each stator coil is one stator slot pitch,
the stator teeth are shaped to allow each stator coil to be installed by pushing the stator coil to surround one of the stator teeth, and
the stator coils comprise tubular cooling channels for conducting cooling liquid in the stator slots in the longitudinal direction of electrical conductors of the stator coils.

The above-described technical features of the stator 900 are not shown in FIG. 9 but the stator can be, for example, according to what is presented in FIG. 8. The stator further comprises a three-phase electrical terminal 906 for connecting to an external electrical system and pipelines 904 for connecting to an external cooling liquid circulation system.

The rotor 960 comprises permanent magnets 941, 942, 943, 944, 945, 946, 947, 948, 949, and 950 for producing an excitation magnetic flux. The arrows shown in the permanent magnets 941-950 illustrate the directions of magnetization of the permanent magnets. It is also possible that the rotor comprises, instead of or in addition to the permanent magnets, excitation windings for producing excitation magnetic flux.

In an electrical machine according to an embodiment of the invention, the number of magnetic poles produced with the permanent magnets of the rotor is greater than the quotient of the number of the stator teeth and the number of phases of the stator winding, i.e. $Q/m/p<1$, where Q is the number of the stator teeth, m is the number of the phases of the stator winding, and p is the number of the magnetic poles of the rotor.

In the electrical machine illustrated in FIG. 9, the number of phases is m=3 and the number of magnetic poles produced with the permanent magnets 941-950 of the rotor is p=10. If, for example, the number of stator teeth is Q=12, then Q/m/p=0.4, i.e. the electrical machine is a fractional slot machine.

The electrical machine illustrated in FIG. 9 can be, for example, a directly driven wind turbine generator. As there is an effective cooling in the stator winding, the maximum efficiency of the electrical machine can be optimized to correspond to the most typical operation point instead of the nominal operation point that represents in wind power applications higher power than the most typical operating point. Thanks to the effective cooling, greater losses can be allowed at the nominal point and thereby the size and weight of the electrical machine can be smaller. The cooling liquid can be, for example, water which is de-ionized or which otherwise has sufficiently low electrical conductivity.

The specific examples provided in the description given above should not be construed as limiting. Therefore, the invention is not limited merely to the embodiments described above.

What is claimed is:

1. A stator for an electrical machine, the stator comprising:
   a stator core comprising a plurality of stator teeth and stator slots, and
   a stator winding comprising a plurality of stator coils,
   wherein width of each stator coil is one stator slot pitch, and the stator teeth are shaped to allow each stator coil to be installed by pushing the stator coil to surround one of the stator teeth without changing the shape of the stator coil, and
   wherein the stator coils comprise cooling tubes made of different material than electrical conductors of the stator coils and attached to the electrical conductors of the stator coils, the cooling tubes forming tubular cooling channels for conducting cooling liquid in the stator slots in the longitudinal direction of the electrical conductors of the stator coils and among the electrical conductors of each of the stator coils, and
   wherein each electrical conductor comprises electrically conductive material which constitutes, together with one and only one of the cooling tubes, at least a part of a cable with a cooling channel so that a cross-section of the cooling tube is in a center of a cross-section of the cable.

2. The stator according to claim 1, wherein each electrical conductor comprises two electrically parallel connected bars of electrically conductive material and one of the cooling tubes is placed between the bars.

3. The stator according to claim 1, wherein each electrical conductor comprises a sleeve of electrically conductive material arranged to surround one of the cooling tubes.

4. The stator according to claim 1, wherein each electrical conductor comprises a bundle of electrically parallel connected wires of electrically conductive material, the bundle being arranged to surround one of the cooling tubes, and the stator coils further comprising electrical insulator material between the wires of the electrically conductive material.

5. The stator according to claim 1, wherein the cooling tubes are made of stainless steel.

6. The stator according to claim 1, wherein the stator coils comprise electrically insulating connecting elements at the ends of the cooling tubes.

7. The stator according to claim 1, wherein the electrical conductors of the stator coils are made of copper.

8. The stator according to claim 1, wherein the stator core consists of a plurality of stator segments.

9. The stator according to claim 1, wherein the stator winding is coated with a layer of resin so as to protect the stator winding against external stresses.

10. The stator according to claim 1, wherein the stator is one of the following: a stator of an inner rotor radial flux machine, a stator of an outer rotor radial flux machine, a stator of an axial flux machine.

11. An electrical machine comprising a rotor and a stator, wherein the stator comprises:
    a stator core comprising a plurality of stator teeth and stator slots, and
    a stator winding comprising a plurality of stator coils,
    wherein width of each stator coil is one stator slot pitch, and the stator teeth are shaped to allow each stator coil to be installed by pushing the stator coil to surround one of the stator teeth without changing the shape of the stator coil, and
    wherein the stator coils comprise cooling tubes made of different material than electrical conductors of the stator coils and attached to the electrical conductors of the stator coils, the cooling tubes forming tubular cooling channels for conducting cooling liquid in the stator slots in the longitudinal direction of the electrical conductors of the stator coils and among the electrical conductors of each of the stator coils, and
    wherein each electrical conductor comprises electrically conductive material which constitutes, together with one and only one of the cooling tubes, at least a part of a cable with a cooling channel so that a cross-section of the cooling tube is in a center of a cross-section of the cable.

12. The electrical machine according to claim 11, wherein the rotor comprises permanent magnets for producing an excitation magnetic flux.

13. An electrical machine according to claim 12, wherein the number (p) of magnetic poles produced with the permanent magnets is greater than the quotient of the number (Q) of the stator teeth and the number of phases (m) of the stator winding, Q/m/p<1.

* * * * *